US008273322B2

(12) United States Patent
Roche et al.

(10) Patent No.: US 8,273,322 B2
(45) Date of Patent: Sep. 25, 2012

(54) SULFATE PROCESS

(75) Inventors: Eric Girvan Roche, Booragul (AU); Philip Ernest Grazier, Kilaben Bay (AU); Alan David Stuart, New Lambton (AU)

(73) Assignee: BHP Billiton Innovation Pty. Ltd., Melbourne, Victoria (AU)

( * ) Notice: Subject to any disclaimer, the term of this patent is extended or adjusted under 35 U.S.C. 154(b) by 631 days.

(21) Appl. No.: 12/440,108

(22) PCT Filed: Sep. 6, 2007

(86) PCT No.: PCT/AU2007/001321
§ 371 (c)(1),
(2), (4) Date: Oct. 8, 2009

(87) PCT Pub. No.: WO2008/028245
PCT Pub. Date: Mar. 13, 2008

(65) Prior Publication Data
US 2010/0028251 A1    Feb. 4, 2010

(30) Foreign Application Priority Data

Sep. 6, 2006   (AU) ............................ 2006904885

(51) Int. Cl.
*C01G 23/047* (2006.01)

(52) U.S. Cl. .......... 423/610; 423/615; 423/616; 423/82; 423/85; 423/86

(58) Field of Classification Search .................. None
See application file for complete search history.

(56) References Cited

U.S. PATENT DOCUMENTS

| | | | |
|---|---|---|---|
| 3,689,219 A * | 9/1972 | Craig | 423/610 |
| 4,288,415 A | 9/1981 | Rahm et al. | |
| 4,288,417 A | 9/1981 | Rahm et al. | |
| 2005/0180903 A1* | 8/2005 | Roche et al. | 423/86 |

FOREIGN PATENT DOCUMENTS

| | | |
|---|---|---|
| EP | 0 869 194 | 2/2004 |
| WO | WO 2005/090619 | 9/2005 |
| WO | WO 2006/105611 | 10/2006 |

* cited by examiner

*Primary Examiner* — Melvin C Mayes
*Assistant Examiner* — Smita Patel
(74) *Attorney, Agent, or Firm* — Brinks Hofer Gilson & Lione; G. Peter Nichols (57) ABSTRACT

A sulfate process for producing titania from a titaniferous material (such as an iron-containing titaniferous material; such as ilmenite) is disclosed. The process includes precipitating titanyl sulfate from a process solution produced in the process. The titanyl sulfate precipitation step includes subjecting the precipitated titanyl sulfate to a shearing action during the course of precipitating titanyl sulfate from the process solution or after precipitation has been completed.

23 Claims, 3 Drawing Sheets

Reductions in the shear stress of TSP slurry with time using a high shearing impellor

SULFATE PROCESS

This application claims priority to PCT Application Serial No. PCT/AU2007/001321 filed Sep. 6, 2007 published in English on Mar. 13, 2008 as PCT WO 2008/028245 and also to Australian Application No. 2006/904885 filed Sep. 6, 2006, the entire contents of each are incorporated herein by reference.

The present invention relates to a process for producing titania from a titaniferous material.

The term "titaniferous" material is understood herein to mean any titanium-containing material, including by way of example ores, ore concentrates, and titaniferous slags.

The present invention relates particularly to the sulfate process for producing titania from a titaniferous material.

International application PCT/AU2004/001421 in the name of the applicant describes an invention of a sulfate process made by the applicant. The disclosure in the International application is incorporated herein by cross-reference.

In general terms, International application PCT/AU2004/001421 describes and claims a sulfate process for producing titania from a titaniferous material (such as an iron-containing titaniferous material; such as ilmenite—$FeTiO_3$ or $FeO \cdot TiO_2$) of the type which includes the steps of:

(a) leaching solid titaniferous material with a leach solution containing sulfuric acid and forming a process solution that includes an acidic solution of titanyl sulfate ($TiOSO_4$) and iron sulfate ($FeSO_4$);

(b) separating the process solution and a residual solid phase from the leach step (a);

(c) precipitating titanyl sulfate from the process solution from step (b);

(d) separating the precipitated titanyl sulfate from the process solution;

(e) treating the precipitated titanyl sulfate and producing a solution containing titanyl sulfate;

(f) hydrolysing the titanyl sulfate in the solution and forming a solid phase containing hydrated titanium oxides and a liquid phase;

(g) separating the solid phase containing hydrated titanium oxides and the liquid phase; and (h) calcining the solid phase from step (g) and forming titania.

In addition, the sulfate process described and claimed in International application PCT/AU2004/001421 includes a step (i) of removing iron sulfate from the process solution from step (b) and/or the depleted process solution from step (d).

The term "hydrated titanium oxides" is understood herein to include, by way of example, compounds that have the formula $TiO_2 \cdot 2H_2O$ and $TiO_2 \cdot H_2O$.

In addition, the term "hydrated titanium oxides" is understood herein to include compounds that are described in technical literature as titanium hydroxide ($Ti(OH)_4$).

Concentrations of metals mentioned hereinafter are understood herein as being determined by Inductively Coupled Plasma spectroscopy (ICP) (all metals) or by titration (in the cases of Ti and Fe—ferrous and ferric).

The applicant has carried out further research work on the sulfate process described and claimed in International application PCT/AU2004/001421 since the priority date of 17 Oct. 2003 of the International application and has identified a number of features that are not disclosed in the International application that are important, separately and in combination, in order to operate the process effectively.

International applications PCT/AU2006/000468, PCT/AU2006/000469, PCT/AU2006/000470, and PCT/AU2006/000471 in the name of the applicant describe and claim inventions that relate to a number of these features. The disclosures in the International applications are incorporated herein by cross-reference.

The present invention is an invention that relates to another of these features.

The present invention relates to the rheology of the precipitates of titanyl sulfate that form in the titanyl sulfate precipitation step (c).

The precipitates tend to form as long needles (typically having an aspect ratio of 100:1, i.e. 100 μm long by 1 μm wide). The needle-like morphology causes significant rheology problems in the titanyl sulfate precipitation step (c) and in subsequent handling of the precipitates. By way of example, even quite low solids loadings can result in thick porridge-like slurries which resist pumping and agitation. Consequently, the titanyl sulfate precipitation step (c) has been regarded as a potential bottle-neck in the process, with only low solids densities being able to be handled.

The applicant has found that it is possible to significantly improve the handling and other properties of the precipitates by subjecting the precipitates to a shearing action, as described herein, during the course of precipitating titanyl sulfate from a slurry or after precipitation has been completed.

Accordingly, in broad terms, the present invention provides a sulfate process for producing titania from a titaniferous material (such as an iron-containing titaniferous material such as ilmenite) that includes a step of precipitating titanyl sulfate from a process solution containing titanyl sulfate produced in the process that is characterised by subjecting the precipitates to a shearing action during the course of precipitating titanyl sulfate from the process solution or after precipitation has been completed.

In other words, in broad terms, the present invention provides a sulfate process for producing titania from a titaniferous material (such as an iron-containing titaniferous material such as ilmenite) which includes the steps of:

(a) leaching solid titaniferous material with a leach solution containing sulfuric acid and forming a process solution that includes an acidic solution of titanyl sulfate ($TiOSO_4$) and iron sulfate ($FeSO_4$);

(b) separating the process solution and a residual solid phase from the leach step (a);

(c) precipitating titanyl sulfate from the process solution from step (b);

(d) separating the precipitated titanyl sulfate from the process solution;

(e) treating the precipitated titanyl sulfate and producing a solution containing titanyl sulfate;

(f) hydrolysing the titanyl sulfate in the solution and forming a solid phase containing hydrated titanium oxides and a liquid phase;

(g) separating the solid phase containing hydrated titanium oxides and the liquid phase; and (h) calcining the solid phase from step (g) and forming titania; and wherein the titanyl sulfate precipitation step (c) includes subjecting the precipitated titanyl sulfate to a shearing action during the course of precipitating titanyl sulfate from the process solution or after precipitation has been completed.

The term "shearing action" is understood herein to mean a mechanical process or action which directly or indirectly causes breakage or attritioning of particles or limits the growth of particles.

One embodiment of the present invention imparts the shearing action during precipitation of the titanyl sulfate from the process solution.

In this embodiment such shearing action is imparted by means of one or more attritioning agitators operating at sufficient revolutions per minute to impart shear. A Smith-type turbine design operating with a tip speed 3-5 m/s is one example of a suitable high shear agitator.

The shearing action may be imparted for a part of or the whole of the time period in which there is precipitation of the titanyl sulfate from the process solution.

The intensity of the shearing action may be varied during the time period in which there is precipitation of the titanyl sulfate from the process solution.

Another embodiment of the present invention imparts the shearing action to the precipitated titanyl sulfate after the precipitation is complete.

The shearing action may be achieved by subjecting the precipitated titanyl sulfate to high shear conditions using a high shear mixer or attritioning agitator, for example a stirred-tank reactor equipped with a Smith-type turbine operating with a tip speed exceeding 3 m/s.

The shearing action may also be imparted to the precipitated titanyl sulfate by passing the precipitated titanyl sulfate though a pump which imparts shear, for example a centrifugal pump equipped with a rotor which imparts shear upon the slurry during pumping.

The shearing action may also be imparted to the precipitated titanyl sulfate by passing the precipitated titanyl sulfate, for example by means of a pump, through a device which imparts shear to the precipitated titanyl sulfate upon passing through the device, for example a choke.

Preferably the titanyl precipitation step (c) is carried out at a temperature of at least 90° C.

Preferably the titanyl precipitation step (c) is carried out at a temperature of less than 140° C.

It is preferred particularly that the titanyl precipitation step (c) be carried out at a temperature in a range of 100-120° C.

Preferably the titanyl precipitation step (c) produces a pumpable slurry of the precipitated titanyl sulfate in the process solution and the solids loading in the slurry is at least 5% by weight of the total weight of the slurry.

The term "pumpable slurry" is understood herein to mean that the slurry can be pumped using standard materials handling slurry pumps and can be filtered with conventional pressure filtration equipment. By way of context, whilst precipitates with aspect ratios of at least 100:1 that form without shearing in accordance with the present invention can be formed in slurries having solids loadings of at least 5% by weight, the slurries can not be pumped or filtered effectively.

More preferably the solids loading of the pumpable slurry is at least 7% by weight.

It is preferred particularly that the solids loading of the pumpable slurry be at least 9% by weight.

The titanyl precipitation step (c) produces a sulfuric acid containing solution and the process may include using the solution in leach step (a).

Preferably the process includes supplying the separated process solution from step (d) and/or the separated liquid phase from step (g) to leach step (a).

According to the present invention there is also provided a titanyl sulfate product produced in step (c) of the above-described process, i.e. a product in the form of precipitated titanyl sulfate that has been subjected to a shearing action during the course of precipitation of titanyl sulfate from a process solution or after precipitation has been completed, the product being in the form of elongate members with an aspect ratio, i.e. a ratio of length to width, of less than 100:1.

Preferably the elongate members have an aspect ratio of less than 70:1.

More preferably the elongate members have an aspect ratio of less than 50:1.

It is preferred particularly that the elongate members have an aspect ratio in a range of 25:1 to 30:1.

The process of the present invention includes the following typical reactions.

Leaching:

Ferric Reduction:

Ferrous Sulfate Crystallisation:

Titanyl Sulfate Precipitation:

Hydrolysis:

Calcination:

The applicant has carried out experimental work on a laboratory scale and a pilot plant scale in relation to the above-described process.

The sulfate process of the present invention is now described further by way of example only with reference to the accompanying drawings of which.

Figure 1:
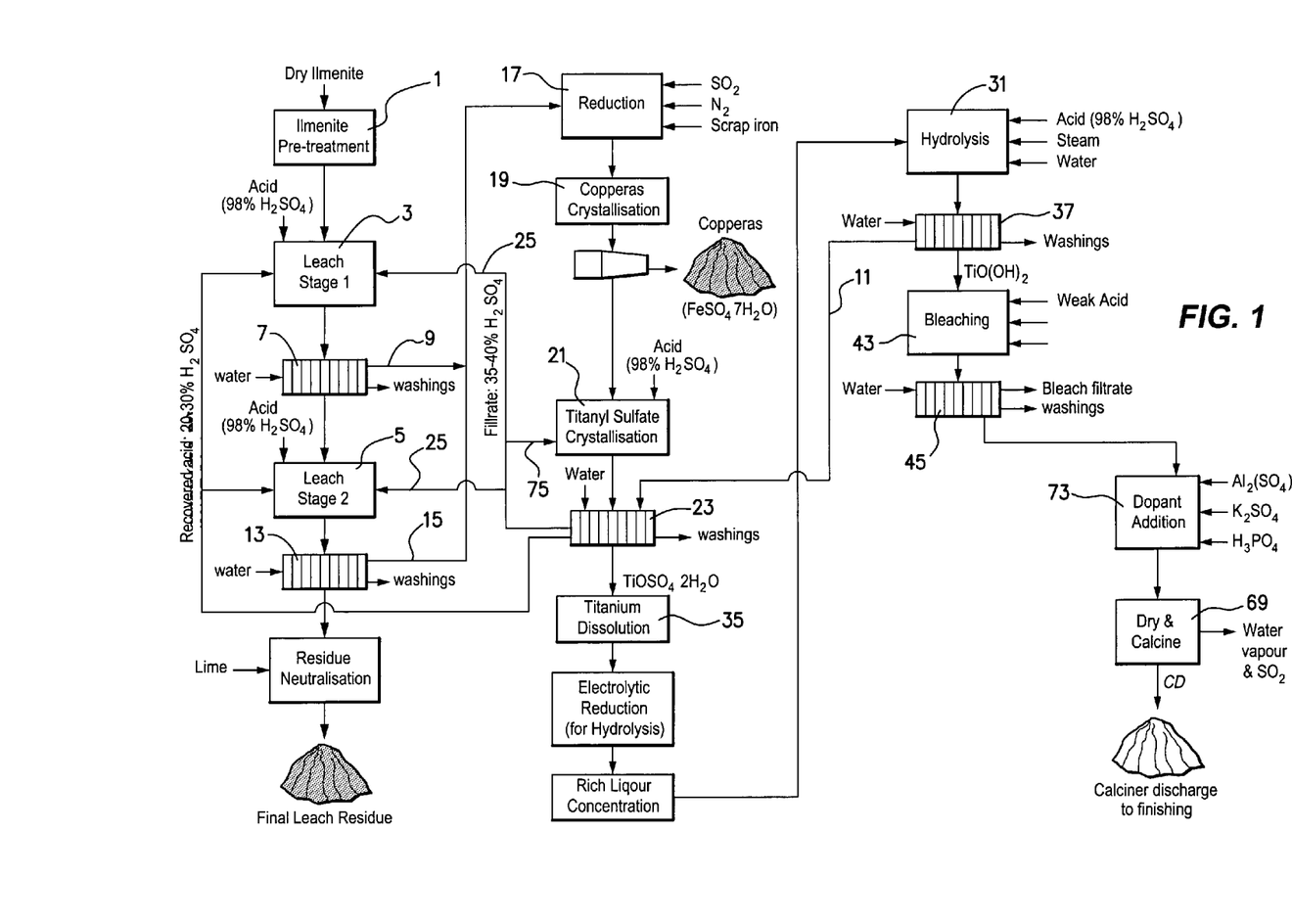
FIG. 1 is a flow sheet of one embodiment of the sulfate process of the present invention.

The flowsheet shown in FIG. 1 includes the following main steps:

(a) leach;
(b) ferric ion reduction;
(c) ferrous sulfate ("copperas") crystallisation;
(d) titanyl sulfate crystallisation;
(e) titanium dissolution;
(f) hydrolysis for pigment;
(g) bleaching;
(h) calcination; and
(i) finishing.

Each of the above steps (a) to (i) is described hereinafter in turn.

The following description is in the context of producing titania from a titaniferous material in the form of ilmenite. The present invention is not limited to this titaniferous material.

With reference to the flowsheet of FIG. 1, dry ilmenite from a storage area is pre-treated in a pre-treatment step 1, such as the ilmenite pre-treatment process described and claimed in International application PCT/AU2005/000387 in the name of the applicant. Alternatively the ilmenite may be pretreated by a conventional process such as grinding. The disclosure in the International application is incorporated herein by cross-reference.

(a) Leach Step

The pre-treated ilmenite is then supplied to the leach step.

The leach step includes two leach stages carried out in separate tanks 3, 5.

Each leach stage is carried out in a single tank 3, 5 as indicated in the flowsheet or in multiple tanks (not shown) arranged in series.

The leach stages may be co-current as shown in the flowsheet or counter-current.

The following sources of acid are added to both leach stages: fresh 98% sulfuric acid, filtrate containing 35-50% sulfuric acid from downstream steps in the process, and recovered acid containing 20-30% sulfuric acid from downstream steps in the process.

The leach tanks 3, 5 are simple stirred tanks. Fibre-reinforced plastic (FRP) is suitable for wetted parts. Other suitable materials are acid bricks and tiles.

The leach slurry discharged from the tank 3 is supplied to a filter 7 and washed with water. The filtrate from the filter 7, preferably a pressure filter, forms a process solution and is supplied via a line 9 to a ferric ion reduction step 17 described hereinafter. The filter cake from the filter 7 is supplied to the leach tank 5 and is leached in the tank. The leach slurry discharged from the tank 5 is supplied to a filter 13 and washed with water. The filtrate from the filter 13, preferably a pressure filter, forms a process solution and is supplied via a line 15 to the reduction step 17. The filter cake from the filter 13 is neutralised with lime and is disposed of as a waste product.

The process conditions in the leach step are controlled to give process solutions of about 40 g/L Ti, 90-100 g/L Fe and 400-450 g/L acid in lines 9 and 15. These are the preferred concentrations of Fe and Ti which avoid ferrous sulfate or titanyl sulfate precipitating out prematurely.

Leaching is about 50-60% in the first stage rising to about 80% overall by the end of the second stage. Higher extractions are feasible with further leaching.

Low acidity in the leach stages can cause the premature hydrolysis and precipitation of $TiO(OH)_2$. Typically this becomes significant below about 425 g/L $H_2SO_4$. Above 450 g/L $H_2SO_4$ it is likewise possible to prematurely crystallise out titanyl sulfate dihydrate $TiOSO_4 \cdot 2H_2O$.

(b) Ferric Ion Reduction Step

The purpose of the ferric ion reduction step 17 is to remove ferric ions from the process solution supplied from the leach step before the titanyl sulfate precipitation step.

The applicant has found that ferric ions precipitate and tend to be carried forward with the titanyl sulfate precipitate intermediate to subsequent steps of the process and has an adverse affect on these process steps and on ultimate product quality. Hence, in view of the co-precipitation of ferric ions and titanyl sulfate, it is desirable to remove ferric ions prior to the titanyl sulfate precipitation step.

Ferric ion reduction is achieved by treating the process solution for the leach step with a suitable reductant, such as any one or more of $Ti^{3+}$ ions, $SO_2$ gas, $H_2$ gas, Zn dust, Al dust and scrap iron, and converting the ferric ions to ferrous ions.

The applicant has carried out experimental work that has established that $SO_2$ gas and scrap iron can reduce ferric ions to ferrous ions in process solutions containing titanyl sulfate produced by leaching ilmenite with sulfuric acid.

Specifically, experimental work established that:

Ferric ions can be reduced to ferrous ions with $SO_2$.

Activated carbon is an effective catalyst to increase the reaction rate.

The activated carbon can be added directly to a process solution, similar to the Carbon in Pulp process used in gold recovery, or can be contained in a column through which the process solution passes if the process solution does not contain a significant amount of solids.

The acid concentration in the process solution increases with $SO_2$ reduction of ferric ions.

The acid produced by the $SO_2$ reduction of ferric ions can be used in leaching of ilmenite.

Ferric ions can be reduced to ferrous ions and $Ti^{4+}$ can be reduced to $Ti^{3+}$ with metallic iron, such as in the form of scrap iron.

The iron in solution increases by about 30 g/l and the acid decreases by 60 g/l, when metallic iron in the form of scrap iron is used.

The experimental work also included experiments to optimise reduction with $SO_2$ and scrap iron by varying the initial chemistry and temperature conditions. For the $SO_2$ system, gas dispersion and adsorption rates and the reaction rates in the activated carbon column were studied. For the scrap iron system, the effects of temperature, acid concentration, and flow rate were studied.

The applicant believes at this stage that a preferred process option for a process solution from the leach step includes using $SO_2$ to reduce the majority of the ferric ions in a process solution to ferrous ions and thereafter, if required, using iron such as in the form of scrap iron to reduce remaining ferric ions and to give about 0-1 g/L $Fe^{3+}$ in solution.

More specifically, the preferred process option includes the of dispersing $SO_2$ into the process solution to load the process solution with a stoichiometric amount of $SO_2$ for reaction with ferric ions and reducing ferric ions to ferrous ions, passing the solution through an activated carbon column, nitrogen or air sparging the solution to remove any unreacted $SO_2$, and if necessary contacting the solution with scrap iron to reduce any remaining ferric ions.

The solution from the sparger may require cooling to below 50° C. to prevent passivation of the scrap iron in the next stage.

The scrap iron contact step may include lowering and removing bales of de-tinned scrap iron into and from a tank containing the solution to control the amount of $Fe^{3+}$ in solution.

The ferric removal step could be before the copperas precipitation step discussed below in section (c), which removes the iron, or after the copperas precipitation step where the extra acid is required for the titanyl sulphate precipitation step.

An alternative process option is to include the steps of dispersing $SO_2$ into the process solution as the solution enters at the base of an activated carbon column, followed by nitrogen or air sparging of the solution to remove any unreacted $SO_2$. In this process option the solution would contains 0-1 g/L $Fe^{3+}$ and would not be further treated for ferric reduction.

The applicant has found that it is advantageous to stop reduction such that almost all the ferric ions have been reduced to the ferrous state, without generation of any free trivalent titanium. This minimises the coprecipitation of vanadium with the titanium sulfate intermediate, and undesirable contamination of the resulting titanium solution by vanadium.

(c) Ferrous Sulfate Precipitation Step

Almost all iron in solution eventually leaves the circuit as green crystals of ferrous sulfate, typically ferrous sulfate heptahydrate ($FeSO_4.7H_2O$), in a ferrous sulfate, i.e. copperas, crystallization step 19.

Significant water is also rejected from the process in the ferrous sulfate. This allows recovery and recycling of medium strength acid from the downstream hydrolysis step 31, leading to a much lower overall acid consumption per tonne of $TiO_2$ product.

In the ferrous sulfate precipitation step 19, the process solution from the ferric reduction step 17 is cooled to about 20° C. in a tank. This causes ferrous sulfate to precipitate out in the tank. The cooled process solution at this stage contains about 40 g/L Fe and 55 g/L Ti. The titanium ion concentration rises due to the lower volume of the cooled process solution.

Removal of water by evaporation during or after the ferrous sulfate precipitation step 19 may be included to give a further water credit, allowing recovery of more weak acid.

The precipitated ferrous sulfate may be separated from the process solution by a conventional centrifuge or by a belt filter.

The ferrous sulfate may be sold directly or converted to another saleable product.

Although 40 g/L Fe (as ferrous) remain in solution, the iron is recirculated through the process flowsheet and eventually returns to the ferrous sulfate precipitation step 19. The ferrous sulfate crystals therefore are essentially the only point of exit for iron from the circuit.

Mn, Al and Mg are minor elements which exit the circuit primarily with the ferrous sulfate crystals.

(d) Titanyl Sulfate Precipitation Step

In the titanyl sulfate precipitation step, generally identified by the numeral 21, fresh 98% sulfuric acid is added to the process solution from the ferrous sulfate precipitation step 19.

The process conditions cause titanium to precipitate out of the process solution as titanyl sulfate dihydrate, $TiOSO_4.2H_2O$, and to form a slurry in accordance with the following reaction:

$$TiOSO_4 + 2H_2O \rightarrow TiOSO_4.2H_2O$$

The actual mechanism of precipitation is not clear.

The preferred operating temperature in the titanyl sulfate precipitation step is 110° C.

Precipitation is slower at less than 90° C.

Precipitation is self seeding in a continuous process—the kinetics of precipitation is accelerated by the presence of the product crystals. For batch operation, seed crystals may be provided, for example by retaining a small portion of slurry from a previous batch.

During the course of or after precipitation of titanyl sulfate has been completed, the slurry is agitated to subject the precipitates to a shearing action that breaks down the needle-like precipitates that tend to form into less elongate members. The applicant has found that the precipitates formed by the shearing action have significantly improved handling properties both during the course of the precipitation step and in downstream processing of the precipitated titanyl sulfate. One consequence of the improved handling properties is that it is possible to operate the precipitation step at significantly higher solids densities. This is important in terms of production rates in the process. Typically, the aspect ratio of the length to the width of the precipitates is less than 70:1, preferably less than 50:1. The precipitates that form without shearing can have aspect ratios exceeding 100:1.

Operating an agitator which imparts significant shear while the precipitates are forming has the dual effects of preventing smaller precipitates growing into longer precipitates and breaking down longer precipitates that may have formed.

To keep the slurry in a fluid state a recycle of filtrate may be used.

Alternatively, the fluidity of the slurry may be increased by increasing the extent of shearing, without recycling filtrate.

The solids in the slurry that is discharged from the precipitation tank or tanks are separated from the slurry by a filter 23, preferably a pressure filter, which forms a filter cake and a filtrate. The solids in the filter cake on the filter 23 are washed by recycled acid supplied from the hydrolysis step via a line 11 as this improves purity of the high strength Ti solution going to hydrolysis. A carefully controlled water wash is used to displace an optimal amount of the remaining acid in the filter cake on the filter 23. Reducing the acid concentration to below 200 g/L destabilises the solids, leading to ultimate dissolution of the solids. Cake squeezing and/or air blowing is then used to control the moisture content of the cake.

The filtrate from the filter 23 contains about 35-50% $H_2SO_4$, 5 g/L Ti and 40 g/L Fe. Some may be recycled if necessary to the titanyl sulfate precipitation stage tank 21 via line 75. The rest is sent to the leach stages 3, 5 via lines 25.

The applicant has carried out experimental work to investigate the effect of shearing titanyl sulfate precipitates and the experimental work is described later in the specification under the heading "Examples".

(e) Titanium Dissolution Step

The water washed filter cake discharged from the filter 23 is added to a stirred tank 35. Over a period of about 2 hours at 50-60° C. the cake dissolves into a high strength Ti titanyl sulfate solution. Lower temperatures can also be used, although the dissolution time may be longer than 2 hours.

The target Ti concentration is at least 200 g/L Ti (as $TiO_2$). The applicant has achieved Ti concentrations considerably exceeding 300 g/L Ti (as $TiO_2$) in laboratory and pilot plant work.

Moreover, in experimental work that included ferric ion control, as described above, the applicant achieved concentrations of less than 5 g/L Fe in the filter cake.

The dissolution process preferably requires less than 100 g/L acid in the solution contained within the filter cake to ensure that the process goes to completion. If most or all acid is washed out the free acid content of the high strength solution can be quite low.

The high strength solution produced in the stirred tank 35 is filtered through a filter cartridge (not shown) to remove siliceous and other fine particulate matter.

Unlike normal metal sulfates, the $TiOSO_4.2H_2O$ in the filter cake does not immediately dissolve in water. Also, its solubility in greater than 20% $H_2SO_4$ is quite low. This suggests the dissolution process is not strictly dissolution. The remarkable solubility of Ti at low acidity (>200 g/L Ti) compared to in 20% $H_2SO_4$ (~5 g/L Ti) favours this view.

(f) Hydrolysis Step

The high strength Ti titanyl sulfate process solution produced in the stirred tank 35 is suitable for all conventional pigment hydrolysis processes.

It also may be used for continuous or batch precipitation of coarse high purity $TiO(OH)_2$.

The pigment hydrolysis processes are typically batch processes due to critical need to control particle size.

The process solution is pre-treated prior to the hydrolysis step 31 to generate about 2 g/L of $Ti^{3+}$ in the solution by conventional means. The $Ti^{3+}$ protects against oxidation of any iron to $Fe^{3+}$, which otherwise co-precipitates with the Ti and imparts undesirable colour to the pigment.

The process solution is adjusted with acid to an A/T ratio suitable for pigment hydrolysis, using either concentrated $H_2SO_4$ or preferably hydrolysis filtrate.

The A/T ratio is a key process parameter. The A/T ratio is defined as:

[Free acid+bound acid in $TiOSO_4$]÷[$TiO_2$]

All parameters are expressed in g/L.

In practice the [Free acid+bound acid in $TiOSO_4$] concentration is measured by a simple titration to pH 7 with sodium hydroxide solution, and the [$TiO_2$] g/L is Ti g/L÷0.6.

Typically, the pigment industry prefers to operate hydrolysis with an A/T ratio in the range of 1.5:1 to 2.5:1, more preferably a ratio of 1.75:1, in order to produce a required particle size range for the pigment industry.

The hydrolysis step 31 is carried out by preheating a heel of water, typically 10-30% of the volume of feed solution, to about 96° C.

The process solution is also preheated to about 96° C. and then is pumped across to the batch hydrolysis tank over a fixed time period.

The hydrolysis tank is equipped with steam heating and a gate type rake stirrer, which operates at low rpm. Preferably the steam heating is indirect so that the filtrate is not diluted by condensate.

The initial few seconds of pumping cause the precipitation of very fine $TiO(OH)_2$ particles, which cause a milky aspect for about 30 seconds, then appear to redissolve. In practice the fine particles are colloidal nuclei which control the size of both the resulting precipitate and the crystal size in the calciner discharge. Control of this step is therefore key to preparing good pigment.

After all process solution is pumped across or dropped in from a header tank, the slurry temperature is carefully heated to the boiling point (typically at 1° C./minute).

The slurry is then boiled for about 5 hours, by which time the Ti remaining in solution has been lowered to about 5 g/L.

The slurry in the hydrolysis tank is then filtered on a filter 37, preferably a pressure filter, to produce a $TiO(OH)_2$ filter cake and a filtrate.

There are no special requirements for filtration as the particle size has already been established. A range of filters are used across the industry. The particles naturally flocculate together and the filtration rate is fast enough that vacuum filtration may be used. The filter cake contains about 55% w/w of water.

The filtrate from the filter 37 contains 350-450 g/L $H_2SO_4$. This is returned via a line 11 to the filter 23 downstream of the titanyl sulfate precipitation tank 21.

(g) Bleaching Step

The $TiO(OH)_2$ filter cake that is discharged from the filter 37 is re-pulped with acid in a bleaching step 43.

A solution containing trivalent titanium ($Ti^{3+}$) is added to reductively leach out chromophores such as Fe, Cr, Mn and V, which otherwise would reduce the whiteness of the final pigment.

The bleaching step 43 typically takes place at 70-80° C. Rutile seed is added at this point The bleached slurry is filtered and washed in a filter 45, preferably a pressure filter.

(h) Calcination Step

The $TiO(OH)_2$ filter cake from the bleaching step 43 is mixed with a number of additives in a dopant addition step 73 and is then dried and calcined in a calciner 69.

The additives may be added as aqueous solutions or as solids. The additives may include 0.2% $K_2O$ as $K_2SO_4$, 0.6% ZnO as $ZnSO_4$ and 0.3% $P_2O_5$ as $H_3PO_4$.

The additives control development of the rutile crystals during calcination, such that the crystal size is 0.27±0.03 μm, rutilisation is 98.5±0.5%, the crystals have a lenticular shape and are not sintered together.

The product produced in the calciner 69 is then transported to downstream customers.

EXAMPLES

Titanyl Sulfate Precipitation

As indicated above in section (d), the applicant has carried out experimental work on titanyl sulfate precipitation involving subjecting precipitated titanyl sulfate to a shearing action during or after the precipitation step. The following Examples 1 and 2 discuss a part of the experimental work.

Example 1

Equipment:
 4 litre capacity glass reaction vessel; dimensions: ID=160 mm, depth=200 mm
 Agitation: titanium shearing agitator (Smith turbine type); diameter=80 mm; height from bottom (approx)=50 to 60 mm; RPM: 400-1000.

Feed:
 $H_2SO_4$, 98%, 510.6 g (277.5 ml)
 Seed 2 g
 Feed solution 3274.3 g (2222.5 ml) containing 20-60 g/L titanium, 20-50 g/L iron in a 550-650 g/L sulfuric acid matrix.
 Total feed: 3786.9 g Reaction Procedure:
 Charge the reaction vessel with the feed solution.
 Start stirring the vessel with a shearing action with the titanium shearing agitator and add sulfuric acid to the reaction vessel.
 Draw the initial sample for analysis.
 Start hot plate and set the reaction temperature set point to 110° C. At 110° C. add the titanium sulfate seed.
 React for 4-6 hours.
 On completion of the reaction, draw sample and determine both the size distribution of the precipitates and the solids loading and then transfer the slurry into another container.

Another volume of the feed solution was tested in the vessel under the same conditions to those described above, save that the feed solution was not agitated with a shearing action.

The titanyl sulfate precipitates produced in both experiments were needle-like.

In addition, the precipitates that were produced under agitated conditions involving a shearing action had aspect ratios predominantly in the range of 25:1 to 30:1 and the precipitates that were produced without agitation involving a shearing action had aspect ratios as high as in the range of 100:1 to 150:1. These results show that shearing agitation was effective in preventing growth of the precipitates.

The above experiments also showed that solids loadings of 9% in the resultant slurries produced in the vessel could be achieved for the precipitates produced with agitation involving a shearing action and that these slurries could be pumped and filtered using standard equipment.

Example 2

Details of Experimental Work

Equipment: As for Example 1 but with an agitator diameter of 76 mm.

Feed: As for Example 1.

Reaction Procedure: As for Example 1, except for the following changes:

Reaction for 6 hours.

On completion of the reaction, draw sample and determine the size distribution, the solids loading, and assess the rheology of the precipitates and then transfer the slurry into another container.

Another volume of the feed solution was tested in a second set of tests in the vessel under the same conditions to those described above, save that the feed solution was not agitated with a shearing action.

The key difference between the two tests was that in one case, i.e. the tests described in the preceding paragraph, there was just normal agitation, using a pitched blade (non-shearing impellor) and in the other set of tests a high shear Smith impellor was used at a tip speed of ~2.8 m/s for the duration of the 6 hour reaction.

After the slurry was made in these 2 ways, each product slurry was split into several samples. Each of these had its solids loading varied for rheology testing. Where an increase in solids loading was desired, the product slurry was filtered to extract filtrate, and where a decrease in solids loading was desired, filtrate was added to the product slurry. (The diluent filtrate was obtained by filtration of the stock slurry).

All solids loading adjusted slurries had their rheology assessed at 60° C.

Replicates of a random dilution/filtration were assessed to obtain information about experimental errors. The wt % of the replicates differed by up to 0.5 wt % for the samples. This error can be due to the inability to prepare an identical solution or in the measurement itself. The measurement error of the yield stress determined in the rheology testing was negligible compared to the slurry wt %.

The rheology of the test slurries was assessed in a Roto-Visco RV3 (Haake) viscometer with the MV cup with either an MV1 or MV2 rotor depending on the fluid. The smaller MV2 rotor was used in preference for fluids with a high yield stress to ease loading the sample into the gap. Throughout the test the chamber was held at 60° C. The test slurries were sheared for 10 minutes at 512 rpm in order to mitigate any effects from the time-varying properties of the fluid. After 10 minutes had lapsed the rotational velocity of the rotor was reduced and speed ranges were selected such that a range was obtained for each fluid under test. The speeds were selected such that the lower readings were ~10% of full scale deflection up to the full range or 512 rpm which ever occurred first.

A particle size analysis was performed on one such test slurry and this confirmed that the shear in the viscometer did not affect the particles. Previous work has shown that the best model to describe the product slurry is as a Bingham model. This was applied to each fluid to obtain a yield stress and plastic viscosity.

A particle size distribution was performed for both sheared and un-sheared slurries. This was done by dispersing ethanol washed titanyl sulfate precipitated solids across a glass microscope slide using ethanol. The ethanol was allowed to evaporate leaving the particles behind. Particle sizing was done manually with optical microscopy and an image analysis package (Scion Image).

Figure 2:
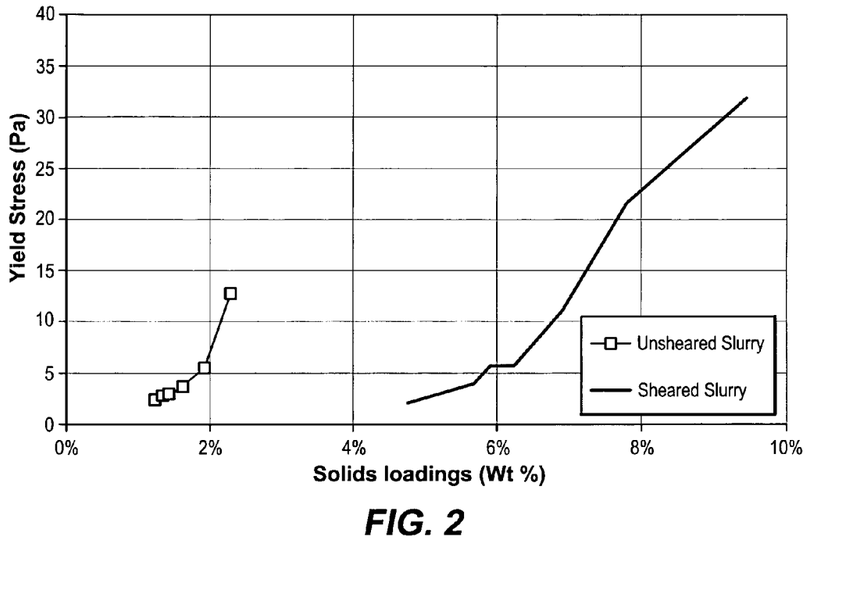
FIG. 2 is a plot of yield stress versus solids loading for sheared and un-sheared samples produced in Example 2.
Figure 3:
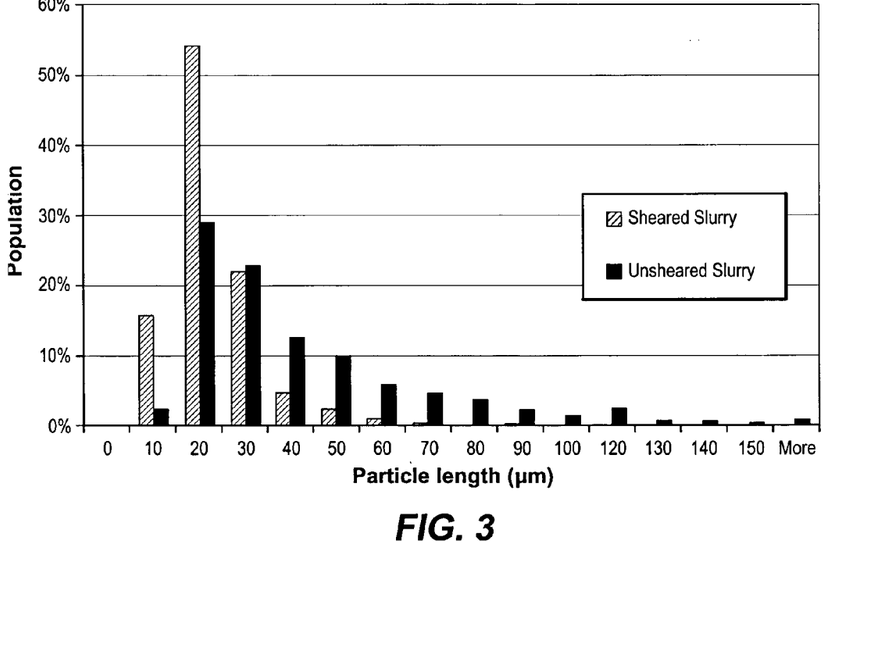
FIG. 3 is a plot of the particle size distribution for sheared and un-sheared samples produced in Example 2.

The results of the above-described tests are summarised in FIGS. 2 and 3.

FIG. 2 is a plot of yield stress versus solids loading for sheared and un-sheared samples. The Figure shows that for a given yield stress (degree of handle-ability), the un-sheared slurry had a lower solids loading compared to the sheared slurry. This shows that shearing enables a higher solids loading product to be processed. (For the same yield stress, a sheared slurry provides 2-3 times the solids loading).

FIG. 3 is a plot of the particle size distribution for sheared and un-sheared samples. The Figure shows that the shearing action reduced the size of the particles and gives them a tighter size distribution, (more than 90% of the sheared particles are 30 micron or under and there are none larger than 70 micron). By comparison, un-sheared slurry particles were larger and have a much wider size distribution. This difference in particle size helps explain the difference in rheological properties of the slurry evident from FIG. 2.

These results further demonstrate the finding of Example 1 that imparting shear improves the ability to handle the product slurry.

Example 3

The ability of the above-mentioned Smith impellor (power number 3.2) to reduce the shear stress of previously formed titanyl sulfate precipitate produced without a shearing action was evaluated in this Example.

Re-constituted slurry at a solids loading of ~14% was used for this test. 10 L of this slurry was placed into a 20 L bucket and exposed to half an hour of shear from a 6 cm Smith turbine at a tip-speed of ~9 m/s. Samples were taken at 5 minute intervals from the buckets and the shear stress-rate profiles were obtained.

Figure 4:
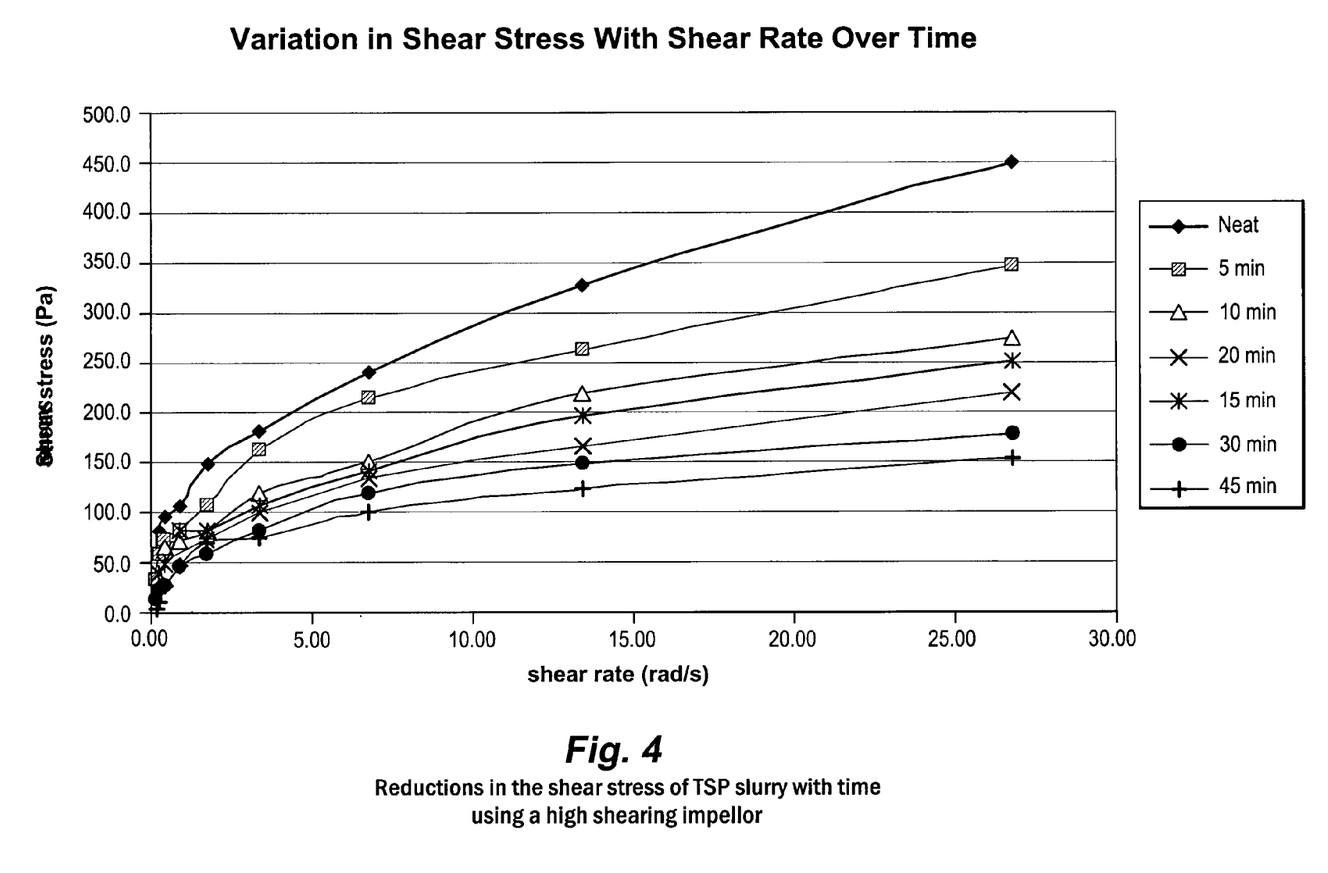
FIG. 4 is a plot of shear stress versus shear rate for samples produced in Example 3.

The results are summarised in the plot of shear stress versus shear rate for as-precipitated and reconstituted titanyl sulfate under non-shear conditions and subsequently sheared samples tested at 5 minute intervals in FIG. 4. The Figure show that the shear stress of the slurry decreased, (i.e. an improvement in rheology) with increased exposure to the attritioning of the Smith impellor.

Many modifications may be made to the process flowsheet described above without departing from the spirit and scope of the present invention.

The invention claimed is:

1. A sulfate process for producing titania from a titaniferous material comprising:
    (a) leaching solid titaniferous material with a leach solution containing sulfuric acid and forming a process solution that includes an acidic solution of titanyl sulfate ($TiOSO_4$) and iron sulfate ($FeSO_4$);
    (b) separating the process solution and a residual solid phase from the leach step (a);
    (c) precipitating titanyl sulfate from the process solution from step (b);
    (d) separating the precipitated titanyl sulfate from the process solution;
    (e) treating the precipitated titanyl sulfate and producing a solution containing titanyl sulfate;
    (f) hydrolysing the titanyl sulfate in the solution and forming a solid phase containing hydrated titanium oxides and a liquid phase;
    (g) separating the solid phase containing hydrated titanium oxides and the liquid phase; and
    (h) calcining the solid phase from step (g) and forming titania;

wherein the titanyl sulfate precipitation step (c) includes subjecting the precipitated titanyl sulfate to a shearing action during the course of precipitating titanyl sulfate from the process solution or after precipitation has been completed to cause the precipitated titanyl sulfate to be in the form of elongate members with an aspect ratio of less than 100:1.

2. The process defined in claim 1 wherein the titanyl sulfate precipitation step (c) includes subjecting the precipitated titanyl sulfate to the shearing action during the course of precipitating titanyl sulfate from the process solution.

3. The process defined in claim 2 wherein the titanyl sulfate precipitation step (c) includes subjecting the precipitated titanyl sulfate to the shearing action by means of one or more than one high shear agitator to impart shear.

4. The process defined in claim 3 wherein the high shear agitator is a Smith-type turbine design operating with a tip speed 3-5 m/s.

5. The process defined in claim 2 wherein the titanyl sulfate precipitation step (c) includes subjecting the precipitated titanyl sulfate to the shearing action for a part of or the whole of the time period in which there is precipitation of the titanyl sulfate from the process solution.

6. The process defined in claim 2 wherein the titanyl sulfate precipitation step (c) includes varying the intensity of the shearing action during the time period in which there is precipitation of the titanyl sulfate from the process solution.

7. The process defined in claim 1 wherein the titanyl sulfate precipitation step (c) includes subjecting the precipitated titanyl sulfate to the shearing action after the precipitation is complete.

8. The process defined in claim 7 wherein the titanyl sulfate precipitation step (c) includes subjecting the precipitated titanyl sulfate to high shear conditions using a high shear mixer or agitator.

9. The process defined in claim 7 wherein the high shear mixer or agitator is a stirred-tank reactor equipped with a Smith-type turbine operating with a tip speed exceeding 3 m/s.

10. The process defined in claim 7 wherein the titanyl sulfate precipitation step (c) includes subjecting the precipitated titanyl sulfate to the shearing action by passing the precipitated titanyl sulfate though a pump which imparts shear.

11. The process defined in claim 7 wherein the titanyl sulfate precipitation step (c) includes subjecting the precipitated titanyl sulfate to the shearing action by passing the precipitated titanyl sulfate through a device that imparts shear to the precipitated titanyl sulfate upon passing through the device.

12. The process defined in claim 2 wherein the titanyl precipitation step (c) is carried out at a temperature of at least 90° C.

13. The process defined in claim 2 wherein the titanyl precipitation step (c) is carried out at a temperature of less than 140° C.

14. The process defined in claim 2 wherein the titanyl precipitation step (c) is carried out at a temperature in a range of 100-120° C.

15. The process defined in claim 2 wherein the titanyl precipitation step (c) produces a pumpable slurry of the titanyl sulfate precipitates in the process solution and wherein a solids loading in the slurry is at least 5% by weight of the total weight of the slurry.

16. The process defined in claim 15 wherein the solids loading is at least 7% by weight.

17. The process defined in claim 15 wherein the solids loading is at least 9% by weight.

18. A titanyl sulfate product produced by precipitating titanyl sulfate in the titanyl sulfate precipitation step (c) of the process defined in claim 1 wherein the product is in the form of elongate members with a ratio of length to width of less than 100:1.

19. The product defined in claim 18 wherein the elongate members have a ratio of length to width of less than 70:1.

20. The product defined in claim 18 wherein the elongate members have a ratio of length to width of less than 50:1.

21. The product defined in claim 18 wherein the elongate members have a ratio of length to width in a range of 25:1 to 30:1.

22. A sulfate process for producing titania from a titaniferous material that includes a step of precipitating titanyl sulfate from a process solution containing titanyl sulfate produced in the process comprising subjecting the precipitates to a shearing action during the course of precipitating titanyl sulfate from the process solution or after precipitation has been completed to cause the precipitated titanyl sulfate to be in the form of elongate members with an aspect ratio of less than 100:1.

23. The process defined in claim 22 wherein the titanyl precipitation step produces a sulfuric acid containing solution and the process includes using the sulfuric acid containing solution in the leach step.

* * * * *